US009577643B1

(12) United States Patent
Pedersen (10) Patent No.: US 9,577,643 B1
(45) Date of Patent: Feb. 21, 2017

(54) SECURE PARTIAL RECONFIGURATION REGIONS

(71) Applicant: Altera Corporation, San Jose, CA (US)

(72) Inventor: Bruce B. Pedersen, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 39 days.

(21) Appl. No.: 14/090,715

(22) Filed: Nov. 26, 2013

(51) Int. Cl.
*G06F 21/00* (2013.01)
*H03K 19/177* (2006.01)
*G06F 21/76* (2013.01)

(52) U.S. Cl.
CPC ......... *H03K 19/17748* (2013.01); *G06F 21/76* (2013.01); *H03K 19/17756* (2013.01)

(58) Field of Classification Search
CPC ................... H03K 19/17728; H03K 19/17752; H03K 19/17756
See application file for complete search history.

(56) References Cited

U.S. PATENT DOCUMENTS

| 5,033,084 | A | * | 7/1991 | Beecher | G06F 21/123 |
| | | | | | 380/277 |
| 5,768,372 | A | * | 6/1998 | Sung | G06F 21/6209 |
| | | | | | 326/38 |
| 6,658,564 | B1 | | 12/2003 | Smith et al. | |
| 7,134,025 | B1 | * | 11/2006 | Trimberger | G06F 12/1425 |
| | | | | | 711/154 |
| 7,368,935 | B2 | * | 5/2008 | Bernier | G06F 21/554 |
| | | | | | 326/38 |
| 7,541,833 | B1 | * | 6/2009 | Neuendorffer | H03K 19/17756 |
| | | | | | 326/38 |
| 7,864,620 | B1 | * | 1/2011 | Pedersen | G11C 7/1006 |
| | | | | | 365/154 |
| 7,885,141 | B2 | * | 2/2011 | Kang | G11C 11/5621 |
| | | | | | 365/189.06 |
| 7,971,072 | B1 | * | 6/2011 | Donlin | H04L 9/14 |
| | | | | | 380/45 |
| 8,436,646 | B1 | * | 5/2013 | Mendel | H03K 19/17724 |
| | | | | | 326/38 |
| 8,627,105 | B2 | * | 1/2014 | Reese | G06F 21/76 |
| | | | | | 380/33 |
| 2006/0248267 | A1 | * | 11/2006 | Xie | G06F 12/0246 |
| | | | | | 711/103 |
| 2012/0278906 | A1 | * | 11/2012 | Pedersen | G06F 21/76 |
| | | | | | 726/34 |
| 2013/0162290 | A1 | * | 6/2013 | Margabandu | H03K 19/17756 |
| | | | | | 326/38 |

(Continued)

*Primary Examiner* — Alexander H Taningco
*Assistant Examiner* — Kurtis R Bahr
(74) *Attorney, Agent, or Firm* — Fletcher Yoder, P.C.

(57) ABSTRACT

Systems and methods for partially reconfiguring a programmable IC device are presented. Processing circuitry on the programmable IC device may identify a first region of the IC device to be reconfigured from a received bitstream. The processing circuitry may read a configuration bit associated with the identified first region, and determine, based on the configuration bit, whether to permit the received bitstream to reconfigure the identified first region. The received bitstream may be authenticated using an authentication key from a first set of authentication keys. The processing circuitry may determine whether to permit the received bitstream to reconfigure the identified first region based on the authentication key and the configuration bit.

20 Claims, 6 Drawing Sheets

(56) References Cited

U.S. PATENT DOCUMENTS

2013/0271178 A1* 10/2013 Pedersen ............... G06F 21/554
                                                        326/8
2015/0033360 A1*  1/2015 Doshi .................... G06F 21/44
                                                        726/27

* cited by examiner

SECURE PARTIAL RECONFIGURATION REGIONS

FIELD OF THE DISCLOSURE

This disclosure relates to systems and methods for partially reconfiguring a programmable integrated circuit (IC) device, such as a field programmable gate array (FPGA).

BACKGROUND OF THE DISCLOSURE

Programmable IC devices, such as FPGAs, may include programmable logic blocks and programmable routing. The programmable logic and routing may be configured with a configuration bitstream that may be loaded into the programmable IC device from an external source. Partial reconfiguration (PR) may be performed on some programmable IC devices by using a follow-on bitstream (e.g., a bitstream loaded after the bitstream that initially configures an FPGA) to partially reconfigure a portion of the programmable logic and routing previously configured by an earlier bitstream.

Some bitstreams implement high-security or high-reliability designs that require tamper protection, as PR may be used by an attacker to modify (e.g., tamper with) a secure bitstream. Bistreams may be encrypted and authenticated, and non-volatile elements in a programmable IC device may be programmed such that only encrypted and authenticated bitstreams are accepted and permitted to reconfigure the programmable IC device. Further features of an illustrative PR device with a look up table (LUT) that clears some bits and rewrites other bits is described in U.S. patent application Ser. No. 09/443,971, filed Nov. 19, 1999, which is hereby incorporated by reference herein in its entirety. However, if a third party, such as a vendor's customer, has the ability to create an encrypted and authenticated bitstream, the third party has the ability to overwrite, whether deliberately or accidentally, any portion of the programmable IC device, including the vendor's base design.

There may be times that it may be desirable to modify a secure design. For example, a vendor may wish to sell a computing platform that contains an FPGA that includes a base region configured by the vendor, and a secondary region that may be partially configured by the vendor's customers. The vendor may want to protect the base configuration while allowing a third party to partially reconfigure other portions of the FPGA.

SUMMARY OF THE DISCLOSURE

In light of the above, the present disclosure relates to systems and methods for partially reconfiguring a programmable IC device. Using the systems and methods presented herein, a programmable IC device may be implemented that is both secured against tampering while at the same time supporting a limited PR capability.

In accordance with embodiments of the present disclosure, there is provided a processing circuitry on a programmable IC device for partially reconfiguring the IC device. The processing circuitry may be operable to receive a bitstream for reconfiguring at least one of a plurality of regions of the IC device, and to identify a first region of the IC device to be reconfigured by the received bitstream. The processing circuitry may be further operable to read a configuration bit associated with the identified first region, and to determine, based on the configuration bit, whether to permit the received bitstream to reconfigure the identified first region. If it is determined that the received bitstream is permitted to reconfigure the identified first region, the processing circuitry may be operable to reconfigure the identified first region using the received bitstream. Methods corresponding to the above-mentioned processing circuitry are also provided.

In accordance with additional embodiments of the present disclosure, there is provided a programmable IC device that includes a first configuration random access memory (CRAM) block having a first plurality of CRAM elements, and a second CRAM block having a second plurality of CRAM elements. A first configuration bit may be associated with the first CRAM block. A second configuration bit may be associated with the second CRAM block. The first and second configuration bits may be used to determine whether a bitstream received by the IC device is permitted to reconfigure the first and second CRAM blocks, respectively.

BRIEF DESCRIPTION OF THE FIGURES

Further features of the disclosure, its nature and various advantages will be apparent upon consideration of the following detailed description, taken in conjunction with the accompanying drawings, in which like referenced characters refer to like parts throughout, and in which.

DETAILED DESCRIPTION OF THE PREFERRED EMBODIMENTS

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

The figures described herein show illustrative embodiments; however, the figures may not necessarily show and may not be intended to show the exact layout of the hardware components contained in the embodiments. The figures are provided merely to illustrate the high level conceptual layouts of the embodiments. The embodiments disclosed herein may be implemented with any suitable number of components and any suitable layout of components in accordance with principles known in the art.

A programmable integrated circuit (IC) device, such as an FPGA, may be divided into configurable regions. In some embodiments, the regions may be relatively small; such regions may include logic array blocks (LABs), digital signal processing (DSP) blocks, and random access memory (RAM) blocks. In some embodiments, the regions may be relatively large. For example, the regions may be rows, columns, halves, or quadrants of an FPGA.

Each configurable region of a programmable IC device may be associated with one or more configuration random access memory (CRAM) elements, which may store logic and/or routing instructions for configuring the programmable IC device. CRAM elements may be programmed and reprogrammed (e.g., reconfigured) with bitstreams received by the programmable IC device. CRAM elements may control pass gates or selection mechanisms (e.g., multiplexers) in a writing network, or obtain instructions from LUTs for processing elements.

CRAM elements may be arranged in block rows and block columns, with multiple rows of CRAM elements per block row and multiple columns of CRAM elements per block column. A group of CRAM elements in the same block row and the same block column may be referred to as a CRAM block. The grouping of CRAM elements into CRAM blocks may be hard-wired (predetermined) in a programmable IC device. In FPGAs, CRAM blocks may have regular structures (i.e., tiled), although the CRAM blocks may vary in size. Each CRAM block may be associated with a respective configurable region of a programmable IC device.

Figure 1:
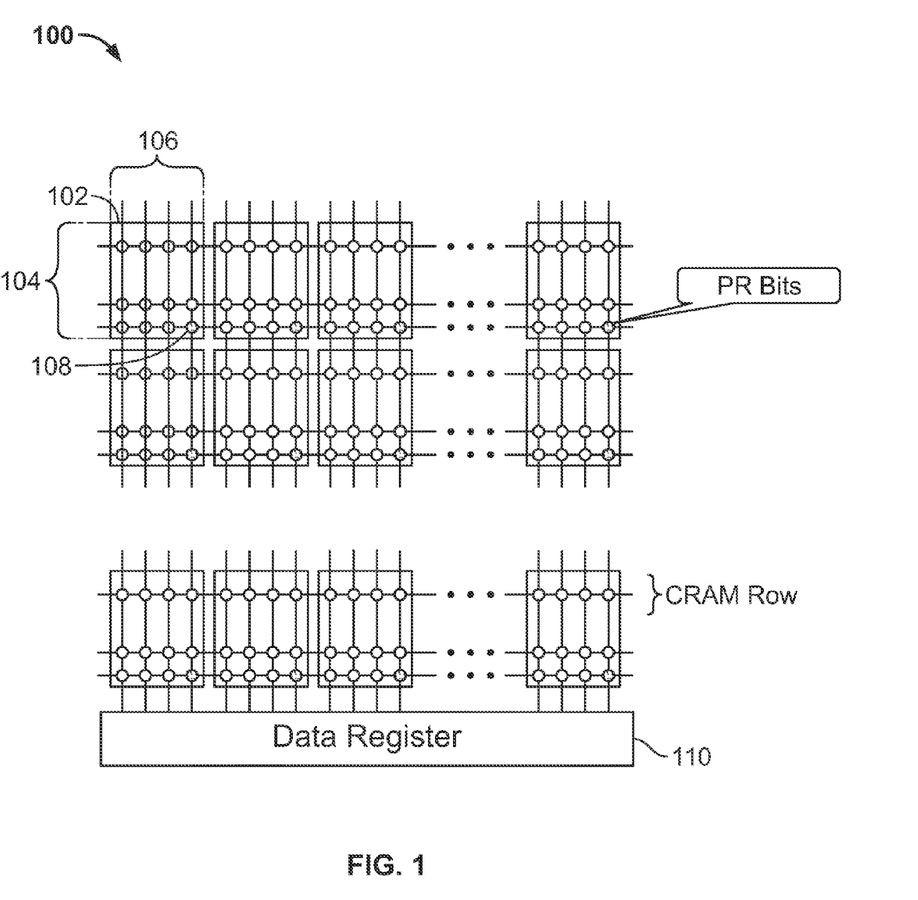
FIG. 1 is a diagram showing the location of configuration bits in configuration random access memory (CRAM) elements of a programmable integrated circuit (IC) device, according to an illustrative embodiment.

FIG. 1 is a diagram 100 showing the location of configuration bits in CRAM elements of a programmable IC device, according to an illustrative embodiment. In FIG. 1, each circle represents a CRAM element. The CRAM elements in FIG. 1 may be arranged in block rows and block columns, and grouped into CRAM blocks. The CRAM elements may be communicatively coupled to data register 110, which may receive data from a source external to the programmable IC device (e.g., from a bit stream). Such data may be shifted from data register 110 into the CRAM elements and used to program the CRAM elements, which may then provide instructions for the programmable logic and/or routing components of the IC device. Data register 110 may read data from the CRAM elements as well as write data to the CRAM elements. In some embodiments, data register 110 may be a shift register. Although the CRAM blocks shown in FIG. 1 are shown to be uniform in size and number of CRAM elements, it should be understood that each CRAM block may have more or less CRAM elements than shown in FIG. 1, and that not all CRAM blocks may have the same number of elements.

Each CRAM block in FIG. 1 may be associated with a configuration bit (also referred to herein as a partial reconfiguration bit, or PR bit). A configuration bit may be used to determine whether a received bitstream is permitted to reconfigure the CRAM elements in the CRAM block associated with the configuration bit, and thus whether the received bitstream is permitted to reconfigure the region of the programmable IC device associated with the CRAM block.

In FIG. 1, CRAM block 102 may include CRAM elements in the same block row 104 and the same block column 106. CRAM element 108 in CRAM block 102 may store a PR bit 108 associated with CRAM block 102. In FIG. 1, each shaded circle represents a CRAM element that stores a PR bit associated with the respective CRAM block. In some embodiments, PR bits may be stored in CRAM elements outside the respective CRAM blocks. For example, all PR bits may be stored together in a memory, but each PR bit may be associated with a different CRAM block. In some embodiments, each CRAM block may be associated with more than one PR bit.

Figure 2:
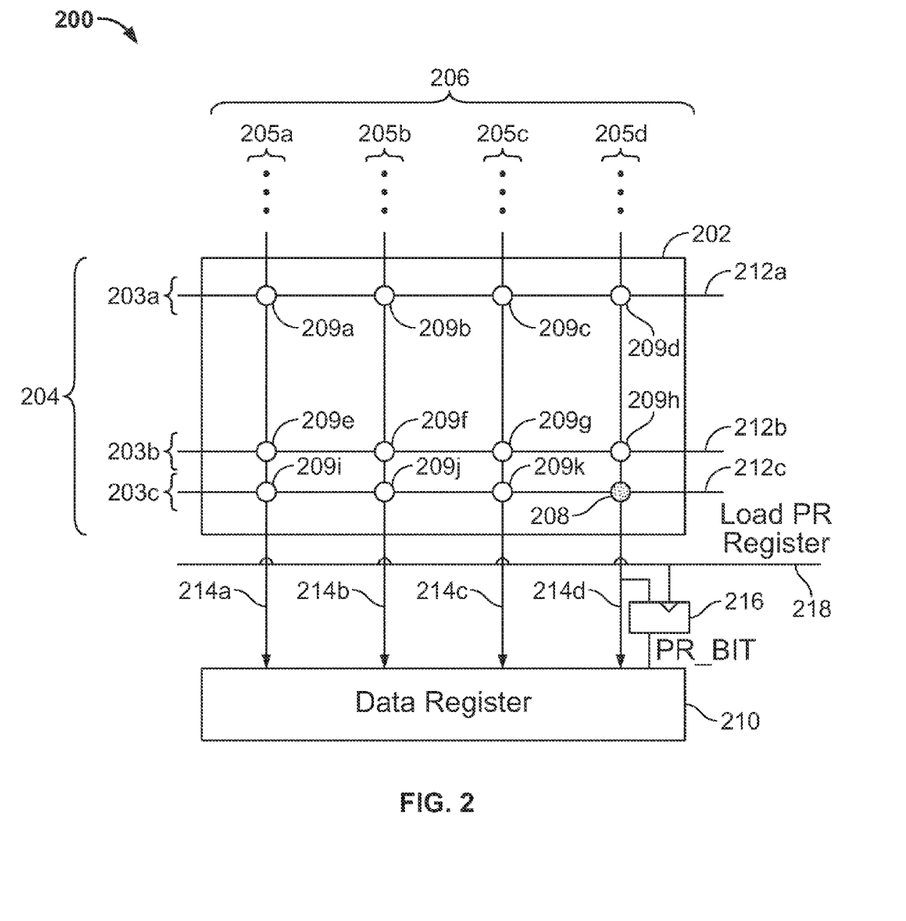
FIG. 2 is a diagram of a CRAM block communicatively coupled to a configuration bit register and a data register, according to an illustrative embodiment.

FIG. 2 is a diagram 200 of a CRAM block 202 communicatively coupled to configuration bit register 216 and data register 210, according to an illustrative embodiment. CRAM block 202 may be analogous to CRAM block 102 of FIG. 1. CRAM block 202 may include CRAM elements 209a-k and 208. The CRAM elements in CRAM block 202 may be arranged in rows 203a-c and columns 205a-d. Rows 203a-c may make up block row 204, and columns 205a-d may make up block column 206. It should be understood that the number of rows and columns of CRAM elements in FIG. 2 are illustrative, and that CRAM block 202 may have any number of rows and columns of CRAM elements.

CRAM elements 209a-d in row 203a may be communicatively coupled to one another by word line 212a. Similarly, CRAM elements 209e-h in row 203b may be communicatively coupled to one another by word line 212b, and CRAM elements 209i-k and 208 in row 203c may be communicatively coupled to one another by word line 212c. CRAM elements 209a, 209e, and 209i in column 205a may be communicatively coupled to one another and to data register 210 by data line 214a. Similarly, CRAM elements 209b, 209f, and 209j in column 205b may be communicatively coupled to one another and to data register 210 by data line 214b; CRAM elements 209c, 209g, and 209k in column 205c may be communicatively coupled to one another and to data register 210 by data line 214c; and CRAM elements 209d, 209h, and 208 in column 205d may be communicatively coupled to one another and to data register 210 by data line 214d. Data lines, which are bidirectional, may also be referred to as bit lines. CRAM element 208 may store a configuration bit associated with CRAM block 202.

Data register 210 of FIG. 2 may be analogous to data register 110 of FIG. 1. Data register 210 may read data from or write data to the CRAM elements of CRAM block 202 via data lines 214a-d. When data register 210 receives data (e.g., from a bitstream) to reconfigure CRAM block 202, the contents of the CRAM element containing the PR bit (also referred to herein as a "PR bit CRAM", e.g., CRAM element 208 in FIG. 2) may be read and then loaded into PR bit register 216. PR bit register 216 may be controlled by a control signal (e.g., Load PR Register signal) 218 from a control block of the programmable IC device. For example, when data register 210 reads CRAM elements in row 203c, a Load PR Register signal may be enabled, so the contents of CRAM element 208 may be loaded into PR bit register 216. When data register 210 reads CRAM elements in other rows, the Load PR Register signal may be disabled, so PR bit register 216 may not be loaded with the contents of another CRAM element. Data register 210 may read/write CRAM elements starting with the bottom row (e.g., row 203c) of CRAM block 202 and then moving up to the other rows. If the PR bit associated with CRAM block 202 is stored in a CRAM element in a row other than row 203c, data register 210 may read the row with the CRAM element containing the PR bit first.

The contents of PR bit register 216 may be used for determining whether to write new data (e.g., data from a bitstream) to CRAM elements along all other word lines (i.e., those that don't have a PR bit CRAM) in CRAM block 202. For example, if the PR bit is set to a protected state, then PR operations may not be allowed for the associated CRAM block and its associated region. Other aspects of determining whether to permit reconfiguration of a region are discussed with respect to FIGS. 4-5. The contents of PR bit register 216 may be sent to data register 210 via a PR_BIT signal.

Figure 3:
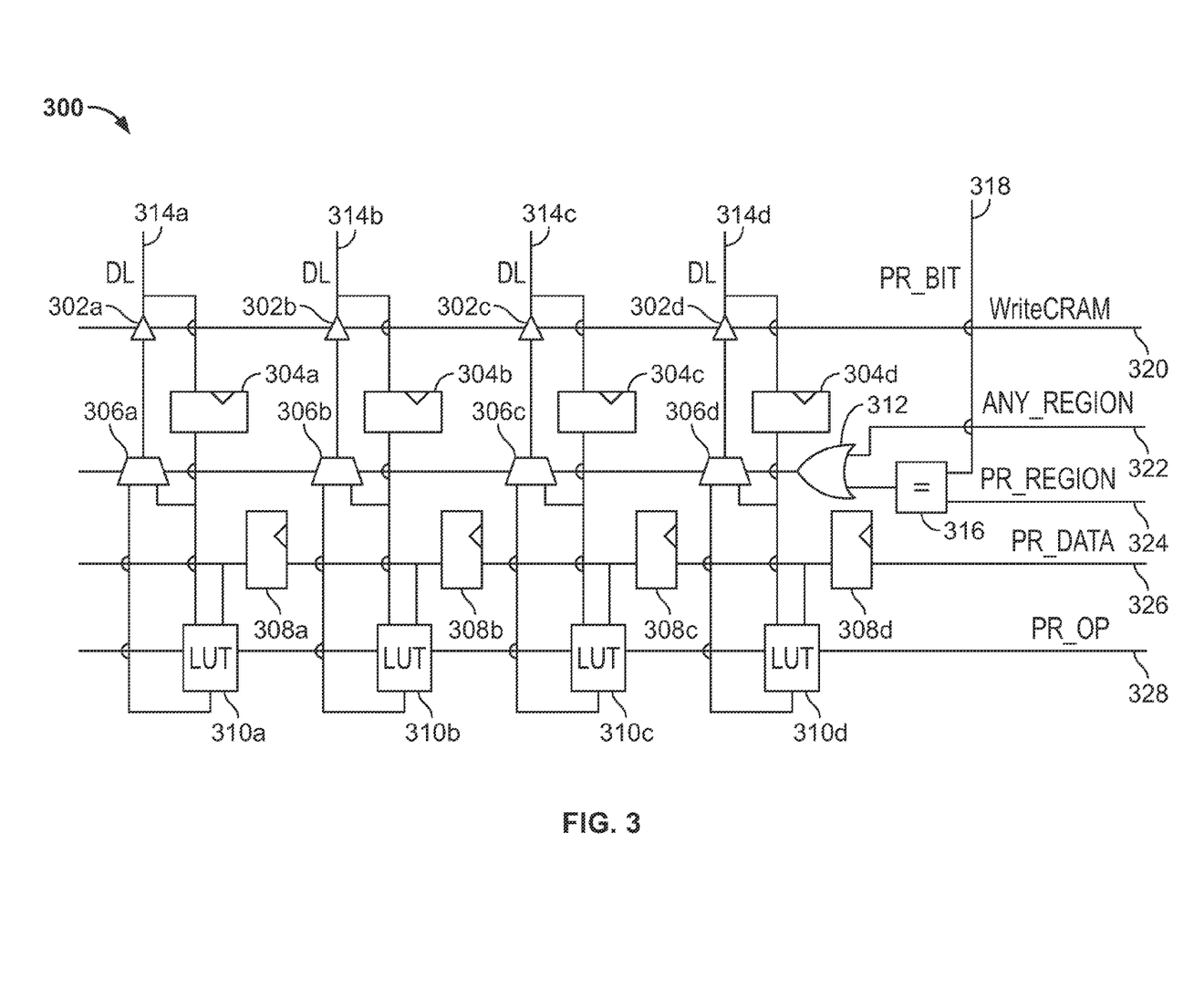
FIG. 3 is a schematic of a data register, according to an illustrative embodiment.

FIG. 3 is a schematic of a data register 300, according to an illustrative embodiment. Data register 300 of FIG. 3 may be analogous to a portion of data register 110 of FIG. 1. Data register 300 may include look up tables (LUTs) 310a-d, flip flops 308a-d, multiplexers 306a-d, flip flops 304a-d, tri-state buffers 302a-d, OR gate 312, and comparator 316.

Data register 300 may be communicatively coupled to a CRAM block, such as CRAM block 102 of FIG. 1, by data lines 314a-d. Data lines 314a-d may be bidirectional. It will be understood by one of ordinary skill in the art that data register 300 of FIG. 3 may be modified such that data register 300 is communicatively coupled to multiple CRAM blocks of FIG. 1 similar to the manner in which data register 300 is communicatively coupled to CRAM block 102 of FIG. 1.

Each of flip flops 304a-d may receive an input from the CRAM block via data lines 314a-d respectively. Flip flops 304a-d may thus store data that is currently stored in the CRAM block.

Each of flip flops 308a-d may receive an input from control signal PR DATA 326 which may provide a bitstream including PR data. The received bitstream may include configuration information for at least one of the configurable regions of the programmable IC device. Configuration information may include inputs to a control block or separate instructions for configurable regions. The received bitstream may additionally include an indication of which of the configurable regions of the programmable IC device are targeted for PR.

Each of LUTs 310a-d may receive a first input signal from flip flops 304a-d respectively and a second input signal from flip flops 308b-d respectively. The input signal received by LUT 310a from flip 304a may be referred to as existing data and the input signal received by LUT 310a from flip 308a may be referred to as new data. LUTs 310a may perform a logical operation on the received existing data and the new data to generate write back data. For example, LUT 310a may perform OR, XOR, NOT, AND, or any other logical operations. Write back data may be transmitted to the CRAM block by data register 300. The CRAM block may store the write back data to further the PR process. LUTS 310b-d may operate in a similar manner as LUT 310a described above.

Each of LUTs 310a-d may receive control signal PR OP 328 from a LUT mask (not shown). Control signal PR OP 328 may control the logical operation performed by each of LUTs 310a-d on the input signals received from flip flops 304a-d and flip flops 308a-d.

Multiplexer 306a may receive a first input signal from LUT 310a, indicating data to write back to the CRAM block, and a second input signal from flip flop 304a, indicating data already in the CRAM block. Each of multiplexers 306b-d may similarly receive a first input signal from LUTs 310b-d respectively and a second input signal from flip flops 304b-d respectively. Each multiplexer 306a-d may receive as a control signal the output of OR gate 312.

OR gate 312 may receive two input signals, ANY REGION 322 and the output of comparator 316. Comparator 316 may also receive two input signals, PR BIT 318 and PR REGION 324. Signals ANY REGION 322 and PR REGION 324 may be control signals received from a control block (not shown) of the programmable IC device. The control block may load PR configuration information into data register 300.

Signal ANY REGION 322 may indicate that the bitstream provided by signal PR DATA 326 may be used to configure any configurable region of the programmable IC device. Signal ANY REGION 322 may be a binary signal that can either be asserted, i.e., have a logical high value, or not asserted, i.e., have a logical low value. When signal ANY REGION 322 is asserted, the output of OR gate 312 will also be asserted regardless of the value of the output of comparator 316. Accordingly, each of multiplexers 306a-d may receive an asserted control signal and each of multiplexers 306a-d may select as output the write back data input signal received respectively from LUTs 310a-d. Therefore, when signal ANY REGION 322 is asserted, the write back data output by LUTs 310a-d may be written to the CRAM block regardless of the values of signals PR BIT 318 and PR REGION 324.

When signal ANY REGION 322 is not asserted, the output of OR gate 312 may be determined by the output of comparator 316. The output of OR gate 312 may mirror the output of comparator 316, i.e., the output of OR gate 312 will be asserted if the output of comparator 316 is asserted, and the output of OR gate 312 will not be asserted if the output of comparator 316 is not asserted.

Signal PR REGION 324 may indicate a targeted subset of all the configurable blocks of the programmable IC device to which the bitstream provided by signal PR DATA 326 may be provided for reconfiguration. Comparator 316 may compare signal PR REGION 324 to signal PR BIT 318. Signal PR BIT 318 may be received from PR bit register 216 of FIG. 2 and may be associated with the PR bit described in connection with FIG. 2 above. If signal PR DATA 326 matches signal PR BIT 318, the output of comparator 316 may be asserted. If signal PR DATA 326 does not match signal PR BIT 318, the output of comparator 316 may not be asserted.

Accordingly, if signal PR DATA 326 matches signal PR BIT 318, each of multiplexers 306a-d may receive an asserted control signal and each of multiplexers 306a-d may select as output the write back data input signal received respectively from LUTs 310a-d. Similarly, if signal PR DATA 326 does not match signal PR BIT 318, each of multiplexers 306a-d may receive a control signal that is not asserted and each of multiplexers 306a-d may select as output the input signal received respectively from flip flops 304a-d.

Each of tri-state buffers 302a-d may receive control signal WRITE CRAM 320 as input. WRITE CRAM 320 may be binary a signal that can either be asserted, i.e., have a logical high value, or not asserted, i.e., have a logical low value. When WRITE CRAM 320 is asserted, tri-state buffers 302a-d may write back data output by multiplexers 306a-d to the CRAM block. When WRITE CRAM 320 is not asserted, tri-state buffers 302a-d may read data from the CRAM block. Flip flops 304a-d may receive the read data as input.

Figure 4:
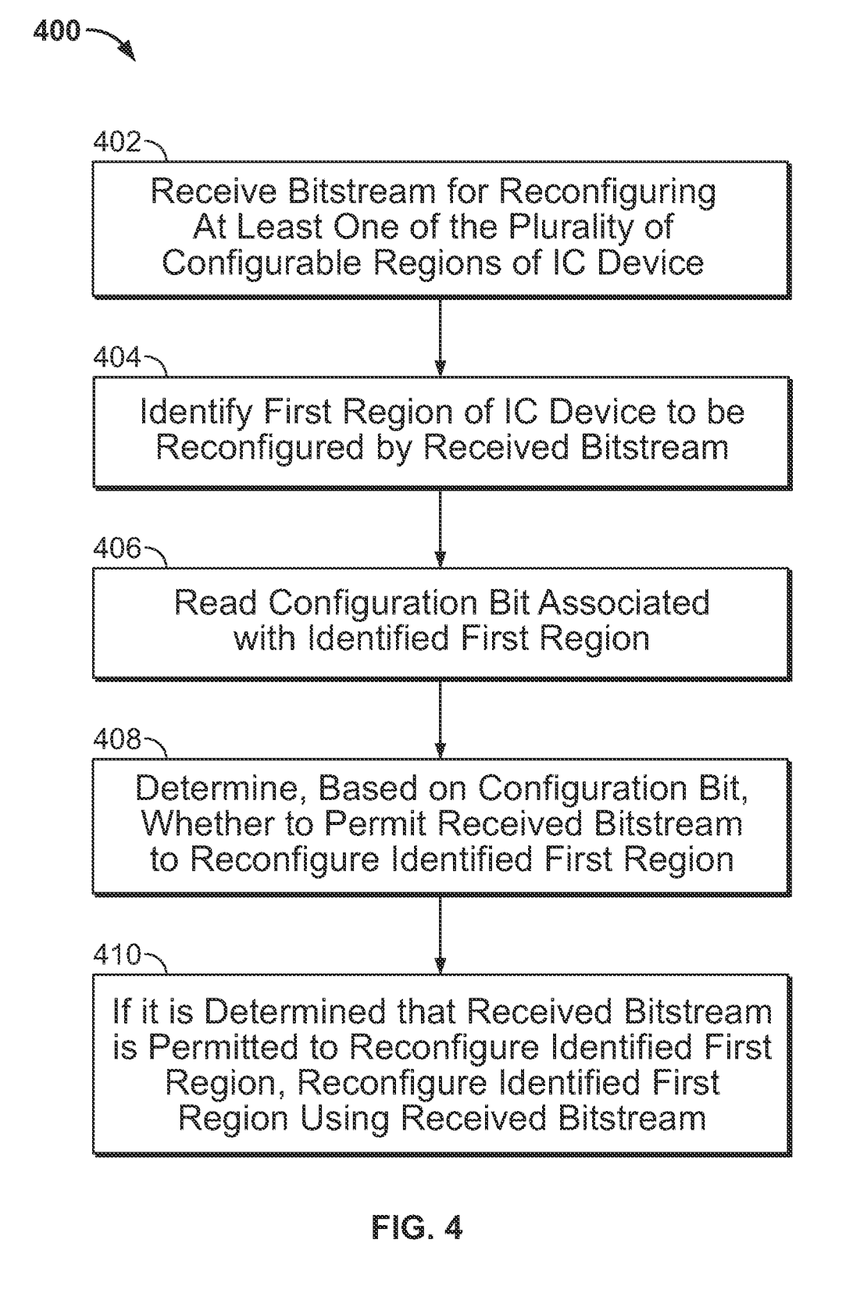
FIG. 4 shows an illustrative flow diagram of a process for partially reconfiguring a programmable IC device, according to an illustrative embodiment.

FIG. 4 shows an illustrative flow diagram of a process 400 for partially reconfiguring a programmable IC device, according to an illustrative embodiment.

At step 402, a bitstream may be received for reconfiguring at least one of the configurable regions of the programmable IC device. The bitstream may be received from a source external to the programmable IC device. For example, the bitstream may be received from signal PR DATA 326 of FIG. 3. The bitstream may include configuration information for at least one of the configurable regions of the programmable IC device, as described in connection with FIG. 3 above.

At step 404, the bitstream received at step 402 may be processed to determine one or more configurable regions of the programmable IC device that are targeted for reconfiguration. The determination of the configurable regions of the programmable IC device targeted for reconfiguration may be based on signals PR BIT 318, ANY REGION 322, and PR REGION 324 of FIG. 3. The determination may be made by processing circuitry, as described in greater detail in connection with FIGS. 2 and 3 above.

At step 406, a configuration bit associated with each of the configurable regions of the programmable IC device identified at step 404 may be read. The configuration bits may be read by data register 210 of FIG. 2, as described in greater in connection with FIG. 2 above.

At step 408, a determination may be made based on the configuration bits read at step 406 as to whether to permit the received bitstream to reconfigure the configurable regions of the programmable IC device identified at step 404. The determination may be made by dataregister 300 of FIG. 3, as described in greater detail in connection with FIG. 3 above.

At step 410, if it is determined that the received bitstream is permitted to reconfigure the configurable regions of the programmable IC device identified at step 404, the identified configurable regions may be reconfigured using the received bitstream. The reconfiguration may be performed by data register 300 of FIG. 3, as described in greater detail in connection with FIG. 3 above.

In an alternate embodiment, authentication keys may be used for determining whether to permit a received bitstream to reconfigure a configurable region of the programmable IC device. For example, a bitstream may have to be authenticated by the correct authentication key to reconfigure any configurable region of the programmable IC device.

An advantage of using authentication keys in this manner may be when an owner of a programmable IC device wishes to permit its clients to be able to modify restricted portions of the programmable IC device. For example, the owner of the programmable IC device may possess a first authentication key that allows the owner to reconfigure any reconfigurable region of the programmable IC device. The owner's clients may possess a second authentication key that allows them to reconfigure only restricted portions of the programmable IC device. To accomplish this, the first authentication key may have the ability to assert the signal ANY REGION 322 of FIG. 3, while the second authentication key may not have the ability to assert the signal ANY REGION 322 of FIG. 3. The second authentication key may permit the clients of the owner of the programmable IC device to write data to only the unprotected configurable regions of the programmable IC device.

In some implementations, the programmable IC device may be associated with two sets of authentication keys and two sets of configuration regions. A PR BIT, such as CRAM element 208 of FIG. 2, may be used to identify each configurable region of the programmable IC device as belonging to either the first or the second set of configurable regions of the programmable IC device. Configurable regions in the first set of configurable regions may be configured only by bitstreams that have been authenticated using an authentication key in the first set of authentication keys. Configurable regions in the second set of configurable regions of the programmable IC device may be configured only by bitstreams that have been authenticated using an authentication key in the second set of authentication keys.

Continuing the previous example described above, the first authentication key in possession of the owner of the programmable IC device may belong to the first set of authentication keys and the first set of configurable regions of the programmable IC device may be any configurable region of the programmable IC device. The second authentication key in possession of the clients of the owner of the programmable device may belong to the second set of authentication keys and the second set of configurable regions of the programmable IC device may be a limited set of all the configurable regions of the programmable IC device.

In some implementations, bitstreams authenticated using authentication keys in the first set of authentication keys may be allowed to configure configurable regions in either of the two sets of configurable regions of the programmable IC device.

Figure 5:
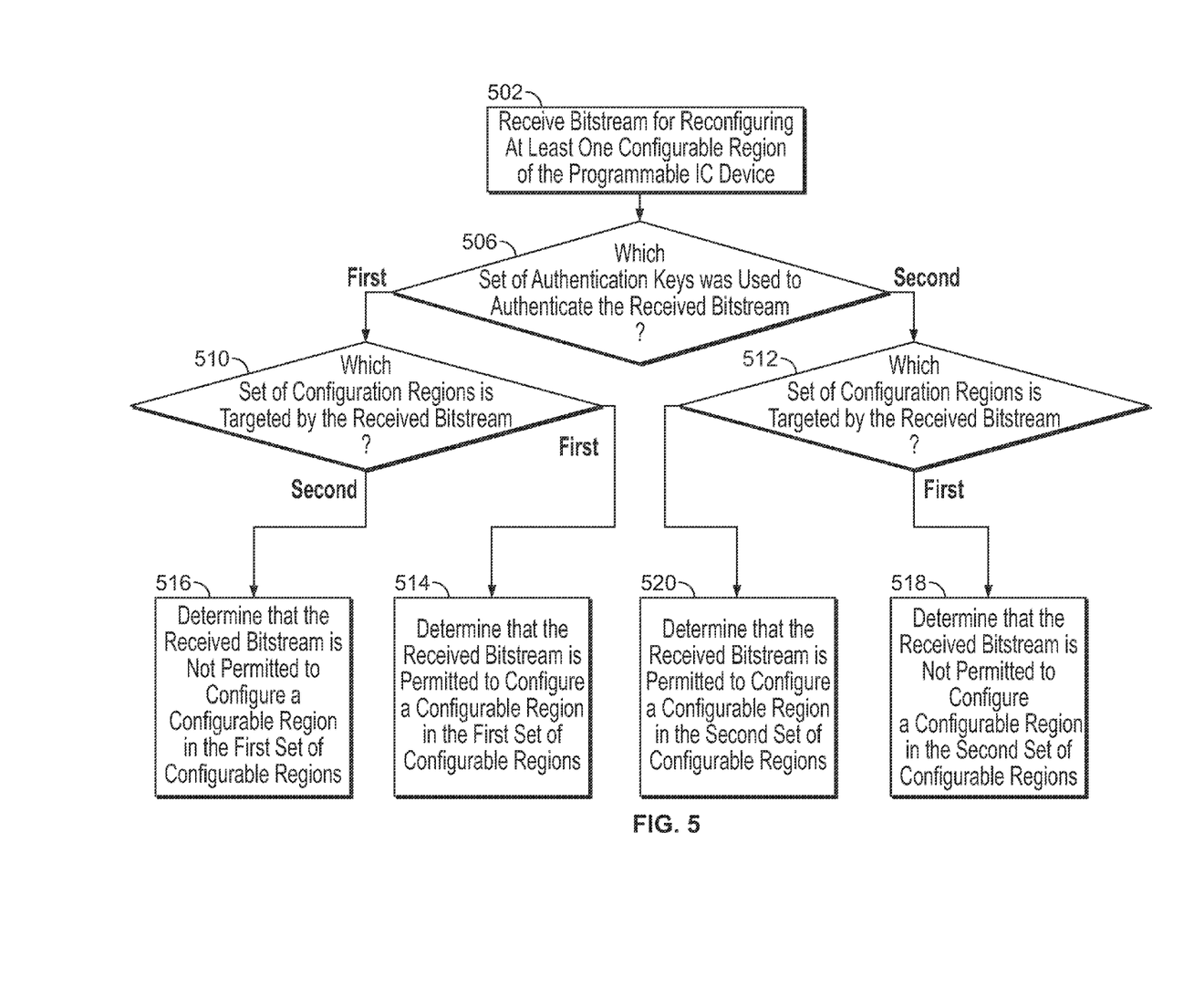
FIG. 5 shows an illustrative flow diagram of a process for determining whether to permit a received bitstream to reconfigure a region of a programmable IC device, according to an illustrative embodiment.

FIG. 5 shows an illustrative flow diagram of a process 500 for determining whether to permit a received bitstream to reconfigure a region of a programmable IC device, according to an illustrative embodiment.

At step 502, a bitstream may be received for reconfiguring at least one configurable region of the programmable IC device. Step 502 may be analogous to step 402 of FIG. 4 described in connection with FIG. 4 above.

At step 506, a determination may be made as to whether the received bitstream has been authenticated using authentication keys from the first set of authentication keys or the second set of authentication keys. The determination may be made by processing circuitry of the programmable IC device. In response to a determination that the received bitstream has been authenticated by an authentication key in the first set of authentication keys the process proceeds to step 510. Otherwise, in response to a determination that the received bitstream has been authenticated by an authentication key in the second set of authentication keys, the process proceeds to step 512.

At step 510, a determination may be made as to whether the received bitstream targets reconfiguring a configurable region in the first set of configurable regions of the programmable IC device or a configurable region in the second set of configurable regions of the programmable IC device. The determination may be made by processing circuitry and/or data register 300 of FIG. 3. In response to the determination that the received bitstream targets reconfiguring a configurable region in the first set of configurable regions, the process proceeds to step 514. Otherwise, in response to a determination that the received bit stream targets reconfiguring a configurable region in the second set of configurable regions of the programmable IC device, the process proceeds to step 516.

At step 514, a determination may be made that the received bitstream is permitted to configure configurable regions in the first set of configurable regions of the programmable IC device.

At step 516, a determination may be made that the received bitstream is not permitted to configure configurable regions in the first set of configurable regions of the programmable IC device.

At step 512, a determination may be made as to whether the received bitstream targets configurable regions from a first set of configurable regions or a second set of configurable regions of the programmable IC device. In response to a determination that the received bitstream targets reconfiguring configurable regions from the first set of configurable regions of the programmable IC device the process proceeds to step 518. Otherwise in response to a determination that the received bitstream targets reconfiguring configurable regions from a second set of configurable regions of the programmable IC device the process proceeds to step 520.

At step 518, a determination may be made that the received bitstream is not permitted to configure configurable regions in the second set of configurable regions of the programmable IC device.

At step 520, a determination may be made that the received bitstream is permitted to configure configurable regions in the second set of configurable regions of the programmable IC device.

It should be understood that one or more elements shown in processes 400 or 500 may be combined with other elements, performed in any suitable order, performed in parallel (e.g., simultaneously or substantially simultaneously), or removed. For example, elements 404 and 406 of process 400 may be performed simultaneously, or in a different order than shown in FIG. 4. Processes 400 and 500 may be implemented using any suitable combination of hardware and/or software in any suitable fashion.

Figure 6:
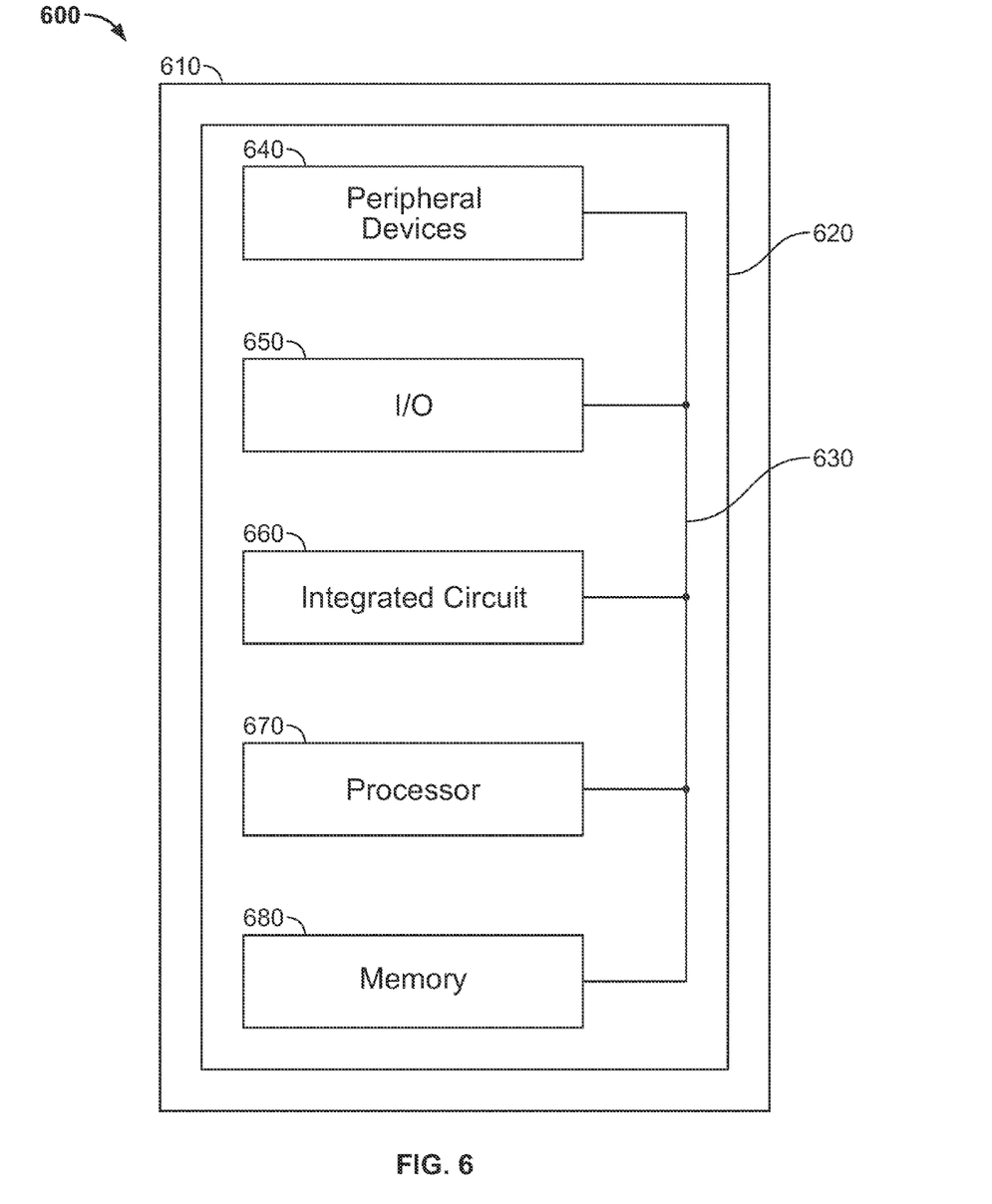
FIG. 6 shows an illustrative system that may be used to implement some embodiments of the present disclosure.

FIG. 6 shows an illustrative system 600 that may be used to implement some embodiments of the present disclosure. For example, system 600 may include systems 100, 200, and/or 300 discussed above with respect to FIGS. 1-3, and may be used to implement processes 400 or 500 discussed above with respect to FIGS. 4-5. System 600 may be or may include a circuit or other device (e.g., processing block, integrated circuit, application specific standard product (ASSP), application specific integrated circuit (ASIC), programmable logic device (PLD), full-custom chip, dedicated chip). System 600 can include one or more of the following components: a processor 670, memory 680, I/O circuitry 650, circuit 660, and peripheral devices 640. The components of system 600 may be connected together by a system bus or other interconnections 630 and may be populated on a circuit board 620 which is contained in an end-user system 610.

Circuit 660 may be an integrated circuit, ASSP, ASIC, PLD, or any other suitable circuit. Circuit 660 may contain one or more blocks of processing circuitry, such as core circuitry of a PLD. In some embodiments, circuit 660 may be used to implement one or more elements of system 100, system 200, and/or system 300. In some embodiments, circuit 660 may include circuitry, such as processing circuitry or core circuitry, that performs process 400 and/or 500.

System 600 may be used in a wide variety of applications, such as computer networking, data networking, instrumentation, video processing, digital signal processing, or any other application where the advantage of using programmable or reprogrammable logic is desirable. Circuit 660 may be used to perform a variety of different logic functions and/or calculate a variety of different mathematical functions. For example, circuit 660 may be configured as a controller or group of processing blocks that work in cooperation with processor 670. Circuit 660 may also be used to perform signal processing. In yet another example, circuit 660 may be configured as an interface between processor 670 and one of the other components in system 600. It should be noted that system 600 is only exemplary, and that the true scope and spirit of the embodiments should be indicated by the following claims.

The foregoing is merely illustrative of the principles of the embodiments and various modifications can be made by those skilled in the art without departing from the scope and spirit of the embodiments disclosed herein. The above described embodiments of the present disclosure are presented for purposes of illustration and not of limitation, and the present invention is limited only by the claims which follow.

What is claimed is:

1. A method for partially reconfiguring a programmable device with a plurality of configurable regions, the method comprising:
receiving a bitstream for reconfiguring one of the plurality of configurable regions of the device;
authenticating the bitstream by determining whether an authentication key used to authenticate the received bitstream is a key from a set of authentication keys stored within the device;
identifying a first region of the device to be reconfigured by the received bitstream;
reading a configuration bit from the identified first region; and
determining whether to permit the received bitstream to reconfigure the identified first region based on the configuration bit and the determining whether the authentication key is from a first subset rather than a second subset of the set of authentication keys stored within the device, wherein the first subset of the set of authentication keys is associated with a permission that allows configuration of the first region and the second subset of the set of authentication keys is associated with a permission that does not allow configuration of the first region.

2. The method of claim 1, wherein the determining further comprises:
comparing the configuration bit to a targeted region bit associated with the received bitstream;
determining that the received bitstream is permitted to reconfigure the identified first region if the targeted region bit matches the configuration bit; and
determining that the received bitstream is not permitted to reconfigure the identified first region if the targeted region bit does not match the configuration bit.

3. The method of claim 1, wherein determining further comprises determining that the received bitstream is not permitted to reconfigure the identified first region if the configuration bit is set to a protected state.

4. The method of claim 1, wherein:
the plurality of regions of the device comprise a first set of configuration regions and a second set of configuration regions; and
determining whether to permit the received bitstream to reconfigure the identified first region comprises:
determining, based on the configuration bit, whether the identified first region is part of the first set of configuration regions.

5. The method of claim 4, wherein the received bitstream is permitted to reconfigure the identified first region if the authentication key used to authenticate the received bitstream is a key from the first subset of the set of authentication keys and not from the second subset of the set of authentication keys.

6. The method of claim 4, wherein:
determining whether to permit the received bitstream to reconfigure the identified first region further comprises:
determining, based on the configuration bit, whether the identified first region is part of the first set of configuration regions or the second set of configuration regions;
determining whether an authentication key used to authenticate the received bitstream is a key from the second subset of the set of authentication keys;
determining that the received bitstream is permitted to reconfigure the identified first region if:

the identified first region is part of the second set of
configuration regions, and
the authentication key used to authenticate the received
bitstream is a key from the second subset of the set
of authentication keys; and
determining that the received bitstream is not permitted to
reconfigure the identified first region if:
the identified first region is part of the first set of
configuration regions, and
the authentication key used to authenticate the received
bitstream is a key from the first set of authentication
keys.

7. The method of claim 1, wherein the determining further comprises:
comparing the configuration bit to a value of a first control signal;
determining that the received bitstream is permitted to reconfigure the identified first region if the configuration bit matches the value of the first control signal; and
determining that the received bitstream is not permitted to reconfigure the identified first region if the configuration bit does not match the value of the first control signal.

8. A partially reconfigurable programmable device with a plurality of regions, the device comprising:
a data register for receiving a bitstream for reconfiguring one of the plurality of regions; and
control circuitry for:
authenticating the bitstream by determining whether an authentication key used to authenticate the received bitstream is a key from a set of authentication keys stored within the device;
identifying a first region of the plurality of regions to be reconfigured by the received bitstream;
reading, from a configuration random access memory (CRAM) block located within the identified first region, a configuration bit associated with the identified first region; and
determining whether to permit the received bitstream to reconfigure the identified first region based on the configuration bit and the determining whether the authentication key is from a first subset rather than a second subset of the set of authentication keys stored within the device, wherein the first subset of the set of authentication keys is associated with a permission that allows configuration of the first region and the second subset of the set of authentication keys is associated with a permission that does not allow configuration of the first region.

9. The device of claim 8, wherein the control circuitry further:
compares the configuration bit to a targeted region bit associated with the received bitstream;
determines that the received bitstream is permitted to reconfigure the identified first region if the targeted region bit matches the configuration bit; and
determines that the received bitstream is not permitted to reconfigure the identified first region if the targeted region bit does not match the configuration bit.

10. The device of claim 8, wherein the control circuitry further determines that the received bitstream is not permitted to reconfigure the identified first region if the configuration bit is set to a protected state.

11. The device of claim 8, wherein:
the plurality of regions of the device comprise a first set of configuration regions and a second set of configuration regions; and the control circuitry further:
determines, based on the configuration bit, whether the identified first region is part of the first set of configuration regions.

12. The device of claim 11, wherein the control circuitry further determines that the received bitstream is permitted to reconfigure the identified first region if the authentication key used to authenticate the received bitstream is a key from the first set of authentication keys and not from the second subset of the set of authentication keys.

13. The device of claim 11, wherein
the control circuitry further:
determines, based on the configuration bit, whether the identified first region is part of the first subset of the set of configuration regions or the second set of configuration regions;
determines whether an authentication key used to authenticate the received bitstream is a key from the second subset of the set of authentication keys;
determines that the received bitstream is permitted to reconfigure the identified first region if:
the identified first region is part of the second set of configuration regions, and
the authentication key used to authenticate the received bitstream is a key from the second subset of the set of authentication keys; and
determines that the received bitstream is not permitted to reconfigure the identified first region if:
the identified first region is part of the first set of configuration regions, and
the authentication key used to authenticate the received bitstream is a key from the first subset of the set of authentication keys.

14. The device of claim 8, wherein the control circuitry further:
compares the configuration bit to a value of a first control signal;
determines that the received bitstream is permitted to reconfigure the identified first region if the configuration bit matches the value of the first control signal;
determines that the received bitstream is not permitted to reconfigure the identified first region if the configuration bit does not match the value of the first control signal; and
determines, in response to a second control signal, that the received bitstream is permitted to reconfigure the identified first region.

15. A programmable integrated circuit (IC) device comprising:
a first configuration random access memory (CRAM) block comprising a first plurality of CRAM elements;
a second CRAM block comprising a second plurality of CRAM elements;
a first configuration bit, the first configuration bit being read from the first CRAM block to determine whether a bitstream received by the device is permitted to reconfigure the first CRAM block;
a second configuration bit, the second configuration bit being read from the second CRAM block to determine whether the bitstream received by the device is permitted to reconfigure the second CRAM block; and
control circuitry that determines that:
the bitstream is authenticated if an authentication key used to authenticate the bitstream is in a first set of authentication keys;

the received bitstream is permitted to reconfigure the first CRAM block if the authentication key is in a first subset of the first set of authentication keys; and the received bitstream is permitted to reconfigure the second CRAM block if the authentication key is in a second subset of the first set of authentication keys.

16. The device of claim 15, wherein:

the first and second plurality of CRAM elements are arranged in block rows and block columns;

each block row of the block rows has a plurality of rows of CRAM elements; and each block column of the block columns has a plurality of columns of CRAM elements.

17. The device of claim 15 further comprising a data register, coupled to the first and second CRAM blocks, for:

determining that the received bitstream is permitted to reconfigure the first plurality of CRAM elements if the first configuration bit matches a value of a control signal;

determining that the received bitstream is not permitted to reconfigure the first plurality of CRAM elements if the first configuration bit does not match the value of the control signal;

determining that the received bitstream is permitted to reconfigure the second plurality of CRAM elements if the second configuration bit matches the value of the control signal; and determining that the received bitstream is not permitted to reconfigure the second plurality of CRAM elements if the second configuration bit does not match the value of the control signal.

18. The device of claim 15, wherein the control circuitry further:

determines that the received bitstream is not permitted to reconfigure the first CRAM block if the authentication key is in the second subset of the set of authentication keys.

19. The device of claim 18, wherein the control circuitry further:

determines that the received bitstream is not permitted to reconfigure the second CRAM block if the authentication key is in the first subset of the set of authentication keys.

20. The device of claim 19, wherein the control circuitry further determines that the received bitstream is permitted to reconfigure the first and the second CRAM blocks if the authentication key is in the first subset of the set of authentication keys.

* * * * *